United States Patent [19]
Cottis

[11] Patent Number: 6,093,765
[45] Date of Patent: Jul. 25, 2000

[54] COMPOSITIONS CONTAINING LIQUID CRYSTALLINE POLYMERS

[75] Inventor: Steve G. Cottis, Hightstown, N.J.

[73] Assignee: E. I. du Pont de Nemours and Company, Wilmington, Del.

[21] Appl. No.: 09/185,178

[22] Filed: Nov. 3, 1998

[51] Int. Cl.$^7$ ............................. C08J 5/10; C08K 3/34; C08L 67/00
[52] U.S. Cl. ..................... 524/451; 524/497; 523/513
[58] Field of Search ................... 523/513, 515, 523/521; 524/451, 497

[56] References Cited

U.S. PATENT DOCUMENTS

| | | | |
|---|---|---|---|
| 4,626,557 | 12/1986 | Duska et al. | 523/100 |
| 5,096,957 | 3/1992 | Duska | 524/434 |
| 5,110,896 | 5/1992 | Waggoner et al. | 528/190 |
| 5,808,118 | 9/1998 | Atkinson | 554/46 |

*Primary Examiner*—James J. Seidleck
*Assistant Examiner*—U. K. Rajguru

[57] ABSTRACT

Excellent mold release coupled with a good retention of mechanical properties (i.e., flexural strength and flexural modulus) is made possible in the liquid-crystal polyester resin composition of the present invention, which comprises: a) 35–85 wt. % of a wholly aromatic polyester which is melt processable and which displays anisotropy in the molten state; b) 15–65 wt. % of a platelet-shaped filler having a mean particle size of less than 5 microns; and c) optionally, up to 20 wt. % titanium dioxide.

12 Claims, No Drawings

COMPOSITIONS CONTAINING LIQUID CRYSTALLINE POLYMERS

FIELD OF THE INVENTION

This invention relates to liquid crystalline polymer compositions having minimum decomposition and exhibiting superior processability during molding.

BACKGROUND OF THE INVENTION

Liquid crystalline polymers (LCPs) are well-known in the prior art, and because they can withstand high temperatures, they are useful for molding articles which are exposed to high temperatures, such as ovenware. For practical uses in ovenware, the materials are required to have excellent thermal resistance, electrical properties, good hardness and impact strength, and high tensile and flexural strength. For example, ovenware should not change in shape even at 200 to 400° C.

U.S. Pat. Nos. 4,626.557 and 5,096,957 disclose molding compositions comprising mixtures of wholly aromatic polyesters and fillers of up to 65 wt. % talc having a particle size distribution in which over 95% of the particles being less than 40 microns. The compositions can be molded into ovenware having good mechanical properties and pleasing visual appearances. However, these compositions when used continuously in an injection molding operation and over a period of time, continually generate decomposition products that become deposited on the mold or in the vents. The problem, commonly termed "plate-out," may cause staining or discoloration in the molded ovenware as well as blockage in the mold. It then becomes necessary to stop the molding operation at regular intervals to clean the mold and associated processing equipment.

The art has thus continued to seek out solutions to the plate-out problems, and more particularly for compositions with minimum decomposition during molding while still possessing the excellent mechanical, electrical, and thermal properties required in ovenware applications.

SUMMARY OF THE INVENTION

Surprisingly, we have found that good processability can be achieved with other desirable characteristics for ovenware applications in a resin composition comprising: a) 35–85 wt. % of a wholly aromatic polyester which is melt processable and which displays anisotropy in the molten state, b) 15–65 wt. % of a platelet-shaped filler having a mean particle size of less than 5 microns; and c) optionally, up to 20 wt. % titanium dioxide.

The invention also relates to a practical method to prevent or minimize decomposition of ovenware composition during molding by compounding a wholly aromatic polyester with a platelet-shaped filler having a mean particle size of less than 5 microns; in an amount of about of about 15 to 65 wt. % talc filler material based on total weight of said aromatic polyester and said filler material.

DETAILS OF THE INVENTION

The present invention provides a novel composition of wholly aromatic polyesters comprising a platelet-shaped filler with a mean particle size of less than 5 microns. The extraordinarily particle size of the talc was found to surprisingly and significantly improve the processability of the composition in molding operations. Liquid crystalline polymers are known in the art by various terms, including "liquid crystal" and "anisotropic melts." A polymer is optically anisotropic if, in the melt phase, it transmits light when examined between crossed polarizers using a polarizing microscope. By "thermotropic" is meant that the polymer may be melted and then re-solidified, i.e. is thermoplastic.

Liquid crystalline polymers

The wholly aromatic polyesters useful herein include thermotropic liquid crystalline polyesters and liquid crystalline poly(ester-amides), poly(ester-imide), poly(ester-amide-imide), polyazomethine, or mixtures thereof. These terms have their usual meaning, and simply indicate that the repeat units in the polymer are joined by ester and optionally amide and/or imide linkages. Preferred polymers are liquid crystalline polyesters, and it is further preferred that these polyesters be aromatic polyesters. By "aromatic" is meant that, except for the carbon atoms contained in functional groups such as ester, amide or imide, all of the carbon atoms in the main chain of the polymer are present in aromatic rings such as phenylene, naphthylylene, biphenylene, etc. Carbon atoms in other types of groupings such as alkyl may be present as substituents on the aromatic rings, as in a repeat unit derived from methylhydroquinone or 2-t-butyl-4-hydroxybenzoic acid, and/or also present at other places in the polymer such as in n-alkyl amides. Other substituent groups such as halogen, ether, and aryl may also be present in the LCP.

As the components of the wholly aromatic polyester used in the LCP compositions of the present invention, there may be used for example: i) hydroquinone; ii) 4,4'-dihydroxybiphenyl(4, 4'-biphenol); iii) isopthalic acid; iv) terephthalic acid; v) p-hydroxybenzoic acid or its derivatives; vi) 4,4'-dicarboxybiphenyl (4,4'-bibenzoic acid) or its derivatives; viii) 2,6-naphthalenedicarboxylic acid; iv) 6-hydroxy-2-naphthoic acid, or combinations thereof. These components are all known in the art and are commercially available or can be prepared by techniques readily available to those in the art. Of the combinations of these components, a combination of hydroquinone, 4,4'-dihydroxybiphenyl, terephthalic acid, 4-hydroxybenzoic acid, and 2,6-naphthalenedicarboxylic acid, is particularly preferred.

Additive Materials

Wholly aromatic polyesters are known to have excellent heat resistance, chemical resistance, improved rigidity and decreased mold shrinkage when blended with a reinforcing material. Applicants have found that the addition of platy (lamellar) or platelet-shaped particulate inorganic compounds having a mean particle size of less than 5 microns as measured by laser diffraction to the wholly aromatic polyesters surprisingly improves the processability of the composition in molding operations. The platelet-shaped fillers includes stratified clay minerals such as mica, kaolin, and talc as well as silica flakes, bismuth oxychloride, calcium carbonate, flakes of glass, of SiO2 or of ceramics, synthetic carrier-free platelets or other comparable materials.

The preferred platelet-shaped fillers for use in the LCP composition of the present invention are talcs, which are commercially available from various sources. The talcs should be of high purity and selectively combined from various ores or have been calcined or subjected to acid treatment. They can be produced by grinding talc ore with a known grinder such as a roller mill, a crusher, etc. to a talc powder nearly having a predetermined mean particle size followed by classifying the powder with a known dry classifier to thereby remove particles not falling within a mean particle size range of less than 5 microns as measured by laser diffraction. Alternatively, the talc powder may be classified while being reground with the known grinder. The talc is also commercially available in a compacted form for ease of handling and feeding the material into the extruder.

In the molding compositions of the present invention, the wholly aromatic polyester resin will generally comprise from about 35 to 85 weight percent and platelet-shaped fillers from about 15 to 65 weight percent. Titanium dioxide can also be used in conjunction with the fillers, in an amount of up to 20 percent based on the total weight percent of the composition to improve the appearance of the final molding products. The preferred range is from about 5 to 15 weight percent.

The surfaces of the titanium oxide particles may be untreated, or may be coated with an oxide of a metal such as aluminum, silicon or zirconia giving them a coating with high surface area, or may be treated with an organic acid such as stearic acid or lauric acid or an organosiloxane oil. Useful crystal forms of titanium dioxide include anatase and rutile. The former is semi-stable and changes to the stable rutile form at high temperature. The rutile form is preferred.

The composition of the present invention can further contain, one or more ordinary additives such as an antioxidant, a heat stabilizer, an ultra-violet absorber, a coloring agent (e.g., a dye or a pigment), a flame retardant, a flame retardancy aid, an antistatic agent, etc., in such an amount so long as the objectives of the present invention are not impaired.

Preparations

The synthesis of the wholly aromatic polyesters is well-known in the art and can be prepared according to the procedure described in U.S. Pat. No. 5,110,896. In producing the composition of the present invention, a wholly aromatic polyester alone or a premix obtained by mixing the polyester, the talc filler and additives in a mixer, is kneaded in a melt mixer and then converted into pellets. The compositions of the present invention can also be prepared by extrusion in accordance with generally-known practice. For example, a twin screw extruder can be employed with addition of the polymer, talc filler and optionally the titanium dioxide at the feed throat. The pellets are subject to injection molding to mold into final products, i.e., ovenware.

EXAMPLES

Applicants have carried out experiments and tests that surprisingly and conclusively demonstrated that it is essential to use platelet-shaped fillers, e.g. talc fillers, having mean particle sizes of about 5 microns or less. The use of talcs of other sizes results in compositions that continually generate decomposition products causing plate-out problems. The following examples serve to give specific illustrations of the practice of this invention but they are not intended in anyway to limit the scope of the invention.

Tests:

Plate-out: Plate-out is a visual observation, seen as a film on the mold surfaces or as defects in the molded object. Our test required establishment of equilibrium molding conditions with a particular formulation and then a measurement of the number of moldings or shots which can be made from the various formulations before the mold must be cleaned. Plate-out was observed at the mold gate, as well as the surface contacted by the warm or molten polymer.

Blister test: Blister is also a visual observation. The problem is due to a surface layer delamination and can be caused either by trapped volatiles or by built-in stresses. Two types of blistering are encountered with polymeric materials: (1) molding blisters which occur during molding; and (2) oven blisters caused when parts are treated at high temperatures for a certain period of time. Test results are for both molding and in the oven tests. The oven test was conducted by placing samples in an oven heated at 250° C. for 20 minutes.

Warpage: This was a visual observation test, with the notation "+" denotes the amount of warpage observed/measured from the circular disc samples as placed on a flat surface:

"+": 4 mils ($\frac{4}{100}$") out of plane
"++": 11 mils out of plane
"+++": 14 mils out of plane.

Gloss. Gloss was measured by conventional means, i.e. simply measuring within a Macbeth™ Novo-Gloss Meter the percent of visible light reflected from the surface at the same angle, i.e., 60 degrees as the incident angle of the light. Higher numbers indicate better gloss.

Colors. The colors achieved with the products of this invention may be evaluated utilizing the standard Hunter Tristimulus values, measuring colors three-dimensionally based on three elements: L, a, and b. The L parameter is a measure of color intensity, and has a value of 0 for absolute black to 100 for absolute white. Parameters a and b refer to the "hue" of the color, reddish/greenish ("a" value) or yellowish/bluish ("b" value).

Additional color tests were also done according to ASTM-2244-93 to measure the "Delta E" and "Delta L" values. ("Delta" is denoted in the tables as δ). "Delta E" is a way of adequately expressing the change (or lack thereof) in reflectance and/or transmittance (and thus color appearance as well) of molded articles from original to after being heated at 260° C. and 20 minutes. "Delta L" is a way of expressing the lightness difference. For commercial purposes, heat-treated articles should have the lowest possible Delta E and Delta L.

ASTM tests. The tests described herein were carried out according to procedures established by the American Society for Testing and Materials (ASTM), including:

Flexural Modulus and Flexural Strength—ASTM D-790.
Elongation to break strain gauges—ASTM D-638.
Notched Izod—ASTM D-256.
DTUL (Heat Deflection Temperature) measured at 261 psi—ASTM D-648.

Components:

The compositions of LCP resin and other additives as used in the examples follow:

LCP: A LCP polymer with the same composition as that of Example 9 of U.S. Pat. No. 5,110,896, comprising hydroquinone/4,4'-biphenol/terephthlatic acid/2,6-naphthalenedicarboxylic acid/4-hydroxybenzoic acid in molar ratio 50/50/85/15/320.

TiO$_2$: A chloride process rutile type titanium dioxide available from SMC Corp. of Baltimore, Md. as Tiona® RCL-4, with 97% TiO2 and with surface treated with alumina and an organic substance.

Polytal 4545: A talc from Whitaker, Clark & Daniel of South Plainfield, N.J., with a mean particle size of 18 microns.

Supra A: An Italian high purity platy talc coated with 1% Monamid™ S sold by the Cypress Industrial Minerals Company, Englewood, Colo. with a mean particle size of 12 microns.

Suprafino A: Another Italian high purity platy cosmetic talc from the Cypress Industrial Minerals Company, with a particle size distribution in which over 95 percent of the particles were less than 40 microns and a mean particle size of 5 microns.

Jetfil 575C: A high purity talc having a median particle size of 3.4 microns from Luzenac America, Inc., Englewood, Colo., supplied in a compact form to facilitate handling and feeding.

PE190: A polyethylene wax made by Hoechst Japan Co., Ltd.

Ultranox 626: A phosphorus-containing antioxidant materials which is commercially available from GE Specialty Chemicals.

Preparation of the Examples

Compounding of LCP resins with the platy filler in the form of talc, $TiO_2$, Ultranox 626 phosphite stabilizer, and optionally in some examples, polyolefin wax, was done in a 40 mm ZSK Werner and Pfleiderer twin-screw extruder having a zone with conventional conveying elements, a zone with kneading or mixing elements, and a low pressure zone with venting under vacuum of any volatiles from the polymer melt, and a die. As the compounded compositions exited the die, they were quenched with a water spray and cut into pellets with a conventional strand cutter. The extruder barrel and die temperatures were maintained at about 340° C. Prior to molding the pellets, the pellets were dried overnight for approximately 16 hours in a vacuum oven with $N_2$ purge at 100–130° C.

In the first trial, a 8 oz HPM molding machine was used. The molding machine barrel temperatures were set at 321° C. and the mold was set at first at 100° C. and then to 104.4° C. The nozzle (5/16" to 3/4" R) was set at 335° C. The mold was held in a "MUD" frame 6" long and 4" wide surface, with the surface being divided into three sections along the width, containing different textures from smooth to coarse with a thickness of 1/16" along the surface. "MUD" frames are die holders or frames and die inserts made by the Master Unit Die Products of Greenville, Mich. and identified as "MUD" frames. On the backside of the frame facing the knock-out pins, there were ribs running along the width with thickness varying from 1/64" to 1/16". The mold deposit was measured and observed on the mold part opposite to the smooth section of the textured side part. The sample compositions were molded under identical cycle time settings: 10 second injection, 9 second hold, 1 second open, 24.21 second overall and 2 second booster. They were molded with a 1/2" pad, 20% back pressure and a clamp pressure of 200 tons. The injection pressures, ram in motion, the screw retraction time, the screw rotation and the shot/part weight varied with the compositions.

In a second trial to test the processability of the compositions, the dried polymer pellets were molded into discs using a 4 ounce 75 ton Cincinnati molding machine fitted with a high compression screw. The mold was a "MUD" frame 4" diameter by 1/16" thick disc. The mold temperature was set at 230° C. for all runs. All composition were molded with the zones set at 346° C. and the nozzle set at 349° C. The clamp pressure was set at maximum of 75 tons and the back pressure was set at 50 psi. For all compositions, the injection time was 10 seconds, the hold booster was 1 second and the ram in motion 0.8 seconds. The screw rotation was set at 100 rpm and a 1/4" pad was used in all cases. These materials were also molded into circular discs, 4" by 1/16" thickness, for the blister, color, and gloss tests as well as close inspection for warpage.

In a third trial, the dried polymer pellets were molded using a 6 oz HPM molding machine with barrel temperatures of about 340° C. and injection pressures of about 4000 psi, into standard test specimens, 1/16" T-bars, 1/8" T-bars, for ASTM tests measuring flexural characteristics, tensile strength, heat distortion temperature, etc.

Unless indicated otherwise, the formulation was for the examples in the first and second trials were: 40 wt. % talc, 5 wt. % TiO2, and the rest the LCP polymer with the same composition as that of Example 9 of U.S. Pat. No. 5,110,896. In some of the examples, polyethylene wax was added to the compositions. In all examples, 0.3 wt. % Ultranox 626 phosphite stabilizer was added to the compositions.

The results shown in Table 1 demonstrated that talc fillers, having mean particle sizes of about 5 microns or less surprisingly and conclusively minimize the plate-out problems often experienced in molding LCP compositions as shown in the Comparable ("Comp") Examples. No mold deposit formed with compositions comprising the 3.5 micron Jetfil talc at high barrel and mold temperatures.

TABLE 1

First trial with HPM Molding Machine

| Example | Talc / particle size in microns | No. of shots to plate out | Comments |
| --- | --- | --- | --- |
| Comp 1 | Supra A - 12 | 55 | Build-up continued and stopped molding after 207 shots |
| Comp 2 | Polytal - 18 | 55 | Build-up stopped molding after 161 shots |
| 3 | Jetfil - 3.2 | none after 122 | Barrel T increased to 392C to induce build-up after 122 shots. No mold deposit up to 222 shots. |

The addition of 0.2 wt. % polyethylene wax PE 190 as a lubricant in the second trial with the Cincinnati molding machine enhanced mold deposit formation.

TABLE 2

Second trial with Cincinnati Molding Machine

| Example | Talc / particle size in microns | No. of shots to plate out | Comments |
| --- | --- | --- | --- |
| Comparable 4 | Supra A - 12 | 50 | — |
| 5 | Suprafino - 5 | between 90–130 | Mold deposit was slight, primarily at gate. |
| 6 | Jetfil - 3.2 | none after 130 | — |
| 7 (6 plus PE190) | Jetfil - 3.2 | 90 | — |

As shown in the following Table 3, the compositions of the present invention also show pleasing appearance characteristics desirable in molded articles such as ovenware. They also show excellent heat treatment tolerance in blister/ oven tests. The gloss and wrap resistance of the compositions of the present invention were the best. It should be noted that the addition of the lubricant decreased the gloss of the mold discs.

TABLE 3

Second trial with Cincinnati Molding Machine (disc samples)

| Example | Talc and particle size in microns | Hunter color test (as molded) | Novo Gloss (as molded) | Color change 250C/20 min | Blister 250C/ 20 min | Warpage 250C/ 20 min |
|---|---|---|---|---|---|---|
| Comparable 8 | Supra A - 12 | L = 89.188 a = 1.98; b = 9.822 | 36.9 | δL = 2.347 δE = 3.23 | None | Warp++ |
| 9 | Suprafino - 5 | L = 88.82 a = 2.13; b = 9.449 | 40.4 | δL = 2.02 δE = 2.36 | None | Warp+++ |
| 10 | Jetfil - 3.2 | L = 87.55 a = 1.40; b = 6.97 | 47.3 | δL = 0.71 δE = 0.742 | None | Warp+ |
| 11 (10 plus PE190) | Jetfil - 3.2 | L = 88.33 a = 1.70; b = 7.65 | 37.4 | δL = 1.464 δE = 1.567 | None | Wrap+ |

In addition to the pleasing appearance, the molded articles of the present invention are also shown to exhibit as excellent mechanical properties inherent with LCP compositions.

TABLE 4

(Third trial with T-bar specimen)

| Example | Formula wt. % | Hunter color test | Color δE 260C/ 20 min. | Tensile strength psi | Elong. Break % | Flex. Strength psi | Modulus psi | DTUL °C. | Not. Izod Ft-lbs |
|---|---|---|---|---|---|---|---|---|---|
| 12 | LCP - 55 Jetfil - 40 TiO2 - 5 | L = 81.3 a = 0.57 b = 7.84 | 1.21 | 17030 | 2.0 | 19000 | 1690000 | 276 | 2.04 |
| 13 | LCP - 55.5 Suprafino - 40 TiO2 - 5 PE wax - 0.2 | — | — | 14280 | 1.704 | 18410 | 1649000 | 271 | — |
| Comp. 14 | LCP - 55.5 Supra A - 40 TiO2 - 5 PE wax - 0.2 | — | — | 16060 | 2.29 | 17530 | 1623000 | 277 | — |
| Comp. 15 | LCP - 55.7 Supra A - 40 TiO2 - 5 | L = 89.1 a = 1.98 b = 9.82 | 2.347 | 15990 | 2.39 | 17480 | 1624000 | 281 | — |
| 16 | LCP - 55.7 Suprafino - 40 TiO2 - 5 | L = 88.8 a = 2.13 b = 9.45 | 2.36 | 18300 | 2.39 | 18790 | 1576000 | 280 | — |
| 17 | LCP - 55.7 Jetful - 40 TiO2 - 5 PE wax - 0.2 | L = 87.5 a = 1.4 b = 6.97 | 1.59 | 17570 | 1.83 | 19500 | 1801000 | 279 | — |
| 18 | LCP - 55.5 Jetfil - 40 TiO2 - 5 | L = 88.3 a = 1.7 b = 7.65 | 0.742 | 18180 | 2.015 | 22050 | 2006000 | 280 | — |

As is apparent from the foregoing description, the materials prepared and procedures followed relate only to specific embodiments of the broad invention. While forms of the invention have been illustrated and described, modifications can be made without departing from the spirit and scope of the invention. Accordingly, it is not intended that the invention be limited thereby.

What is claimed is:

1. A wholly aromatic polyester resin composition having excellent processability, comprising:

a) 35–85 wt. % of a wholly aromatic polyester which is melt processable and which displays anisotropy in the molten state;

b) 15–65 wt. % of a platelet-shaped filler having a mean particle size of about 5 microns or less; and c) optionally, up to 20 wt. % titanium dioxide.

2. The composition of claim 1, wherein said wholly aromatic polyester is a polyester, poly(ester-amide), poly(ester-imide), poly(ester-amide-imide), or polyazomethine.

3. The wholly aromatic polyester resin composition of claim 1, wherein said platelet-shaped filler is talc.

4. The wholly aromatic polyester resin composition of claim 1, wherein titanium dioxide is a pigment with 97% TiO2 and with surface treated with alumina and an organic substance.

5. The wholly aromatic polyester resin composition of claim 1, wherein said wholly aromatic polyester is a thermotropic liquid crystalline polymer comprising repeating units derived from the group consisting of: i) hydroquinone; ii) 4, 4'-dihydroxybiphenyl; iii) isopthalic acid; iv) terephthalic acid; v) p-hydroxybenzoic acid; vi) 4,4'-dicarboxybiphenyl; viii) 2,6-naphthalenedicarboxylic acid; iv) 6-hydroxy-2-naphthoic acid, or combinations thereof.

6. The wholly aromatic polyester resin composition of claim 1, wherein:
   a) said thermotropic liquid crystalline polymer component is present in an amount of about 50 to about 70 weight percent; and
   b) said platelet-shaped filler component is present in an amount of about 30 to 50 weight percent, wherein the weight percents are based upon the weight of components a) and b) only.

7. A method for making wholly aromatic polyester resin composition with excellent injection molding processability characteristic, which comprises the steps:
   a) preparing a thermotropic liquid crystalline polymer component which is an aromatic polyester, poly(ester-amide), poly(ester-imide), poly(ester-amide-imide), or mixtures thereof; and
   b) melt blending the wholly aromatic polyester produced in step a) with about 15–65 wt% of a platelet-shaped filler having a mean particle size of about 5 microns or less, wherein the weight percents are based upon total weight percent of the resin composition.

8. The method of claim 7, further comprises melt blending the wholly aromatic polyester with up to 20 wt. % titanium dioxide, wherein the weight percents are based upon total weight percent of the resin composition.

9. The method of claim 7, wherein said thermotropic liquid crystalline polymer is a wholly aromatic polyester comprises repeating units derived from the group consisting of: i) hydroquinone; ii) 4, 4'-biphenol; iii) isopthalic acid; iv) terephthalic acid; v) p-hydroxybenzoic acid; vi) 4,4'-dihydroxybiphenyl; viii) 2,6-naphthalenedicarboxylic acid; iv) 6-hydroxy-2-naphthoic acid, or combinations thereof.

10. The method of claim 7, wherein said platelet-shaped filler is talc.

11. A molded article of permanent ovenware, comprising:
    a) 35–85 wt % of a wholly aromatic polyester which is melt processible and which displays anisotropy in the molten state;
    b) 15–65 wt % of a platelet-shaped filler having a mean particle size of about 5 microns or less; and
    c) optionally, up to 20 wt % titanium dioxide.

12. The molded ovenware article of claim 11, wherein said platelet-shaped filler is talc.

* * * * *